(12) United States Patent  (10) Patent No.: US 7,256,248 B2
Sugo  (45) Date of Patent: Aug. 14, 2007

(54) IMIDE SILICONE RESIN AND PRODUCTION PROCESS THEREFOR

(75) Inventor: Michihiro Sugo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 358 days.

(21) Appl. No.: 10/653,246

(22) Filed: Sep. 3, 2003

(65) Prior Publication Data

US 2004/0048997 A1   Mar. 11, 2004

(30) Foreign Application Priority Data

Sep. 4, 2002   (JP) .............................. 2002-259317

(51) Int. Cl.
*C08G 77/26* (2006.01)
(52) U.S. Cl. .............................. 528/28; 528/31; 528/26
(58) Field of Classification Search .................. 528/31, 528/28, 26
See application file for complete search history.

(56) References Cited

U.S. PATENT DOCUMENTS

| 4,404,350 | A | * | 9/1983 | Ryang | ........................... 528/26 |
| 4,472,565 | A | | 9/1984 | Ryang | |
| 4,517,342 | A | | 5/1985 | Ryang | |
| 4,522,985 | A | | 6/1985 | Ryang | |
| 4,533,737 | A | | 8/1985 | Ryang | |

FOREIGN PATENT DOCUMENTS

| EP | 0349010 | 1/1990 |
| EP | 1167423 | 1/2002 |
| EP | 1184403 | 3/2002 |

OTHER PUBLICATIONS

Patent Abstracts of Japan for JP2003020337, published Jan. 24, 2003, Nippon Unicar Co. Ltd.
Patent Abstracts of Japan for JP7062103, published Mar. 7, 1995, Sumitomo Bakelite Co.

* cited by examiner

*Primary Examiner*—Margaret G. Moore

(57) ABSTRACT

A novel imide silicone resin is provided that on heat treatment is capable of easily forming a cured resin coating with excellent solvent resistance, humidity resistance and durability, as well as a production process therefor. The imide silicone resin has a structure of the formula (1) shown below, which is the addition reaction product of an organopolysiloxane with two silicon-bonded hydrogen atoms, and an imide compound with two olefin-based carbon-carbon double bonds

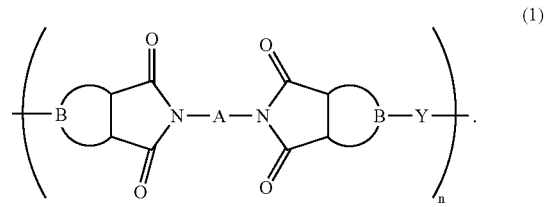

(1)

16 Claims, No Drawings

IMIDE SILICONE RESIN AND PRODUCTION PROCESS THEREFOR

BACKGROUND OF THE INVENTION

1. Field of the Invention

The present invention relates to a novel imide silicone resin that displays excellent heat resistance, solvent resistance, and adhesion and bonding to base materials, as well as a production process therefor, and a cured resin coating produced therefrom.

2. Description of the Prior Art

Polyimide resins display excellent heat resistance and electrical insulation, and are consequently widely used as resin varnishes for electronic components and the like, and flexible printed wiring board materials. However, problems associated with polyimide resins include poor flexibility because they are rigid, poor ease of use because they have high glass transition temperatures, and poor solubility in organic solvents. As a result, a variety of silicone modified polyimide resins have been proposed (for example, Japanese Laid-open publication (kokai) No. Hei 10-195278 (JP10-195278A), Japanese Laid-open publication (kokai) No. Hei 8-34851 (JP8-34851A)). Silicone modified polyimide resins are able to compensate for the drawbacks of polyimide resins described above, while further improving the adhesion to base materials and the electrical characteristics.

However, conventional syntheses of silicone modified polyimide resins suffer a number of problems, including requiring extreme synthesis conditions in that after an acid dianhydride and a diamine compound have been reacted together to synthesize a polyamic acid, a ring closing polyimidization reaction at a high temperature of at least 150° C. is required, and the fact that the syntheses take considerable time. As a result, a resin material that offers at least the same functions as conventional silicone modified polyimide resins, is able to be synthesized more easily, and is also a thermosetting resin, has been required.

SUMMARY OF THE INVENTION

An object of the present invention is to provide a novel imide silicone resin capable of satisfying the above requirements.

As a result of intensive investigations aimed at achieving the above object, the inventors of the present invention finally arrived at the present invention. Namely, the present invention provides an imide silicone resin with a structure represented by a general formula (1) shown below, and a production process therefor.

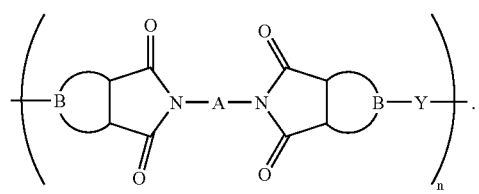

[wherein, each A is a bivalent organic group, each B represents, independently, a trivalent group selected from groups having the formulas shown below, in which the two single bonds protruding in a substantially identical direction are bonded to an imide ring to form a ring structure and the third single bond is bonded to Y, Y is a bivalent group represented by a general formula (2) shown below, and n is an integer from 2 to 100.

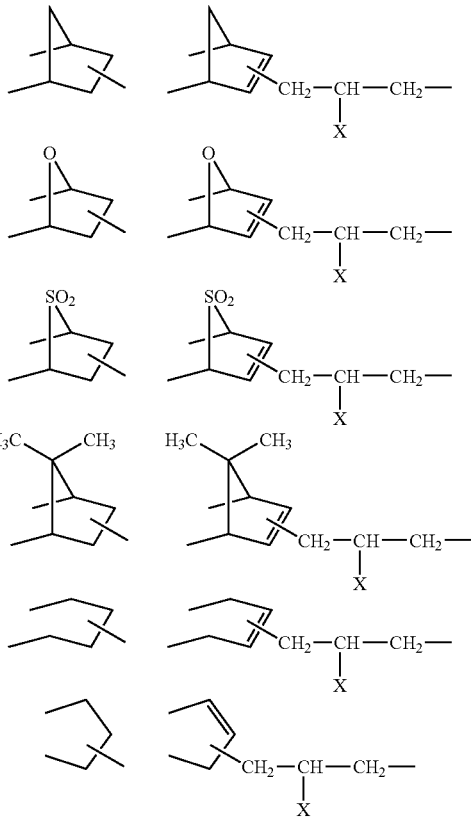

(wherein in each formula, X represents a hydrogen atom or a methyl group)

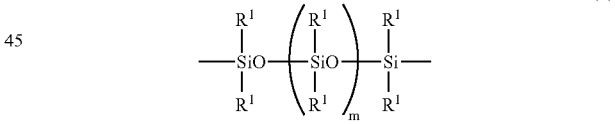

(wherein, each $R^1$ represents, independently, a monovalent organic group, and m is an integer from 0 to 100)]

A novel imide silicone resin of the present invention is capable of easily forming a cured resin coating by heat treatment. This cured resin coating displays excellent resistance to organic solvents such as ketones and the like, and also displays excellent adhesion and bonding to metal substrates such as copper, even under conditions of high humidity, as well as excellent durability. Accordingly, the imide silicone resin is useful for the surface protection of various metals, or as a protective material for semiconductor elements, a protective material for various substrates, an adhesive, or a heat resistant paint.

Furthermore, a production process for an imide silicone resin of the present invention is simple, and enables the target product to be obtained with good efficiency.

DETAILED DESCRIPTION OF THE PREFERRED EMBODIMENTS

As follows is a detailed description of the present invention.

[Imide Silicone Resin]

As described above, an imide silicone resin of the present invention has a structure represented by a general formula (1) shown below.

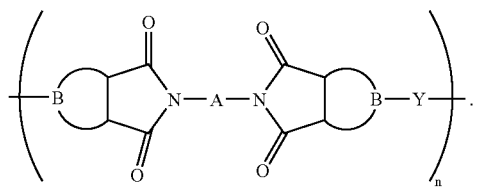

(1)

[wherein, each A is a bivalent organic group, each B represents, independently, a trivalent group selected from groups having the formulas shown below, in which the two single bonds protruding in a substantially identical direction, i.e., the single bonds a and b in each of the formulas below, are bonded to an imide ring to form a ring structure and the other single bond, i.e., the single bond c in each of the formulas is bonded to Y, Y is a bivalent group represented by a general formula (2) shown below, and n is an integer from 2 to 100, and preferably from 3 to 70.

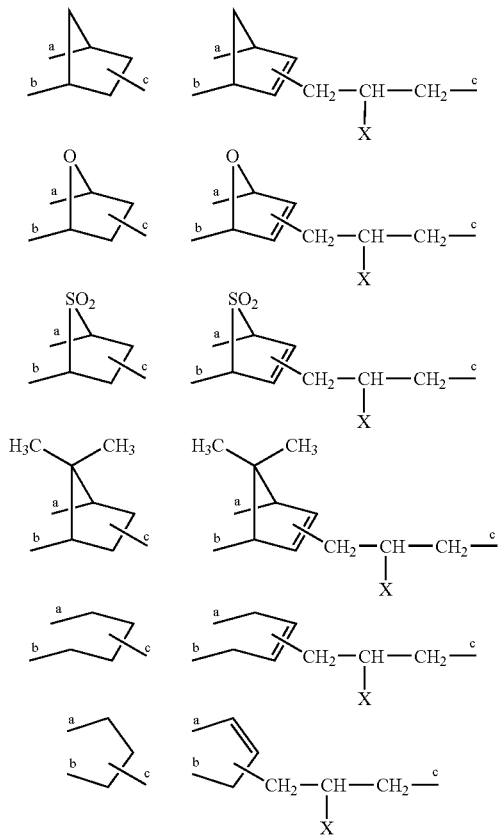

(wherein in each formula, X represents a hydrogen atom or a methyl group)

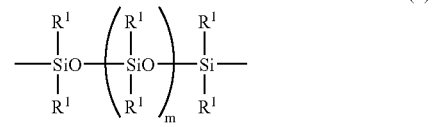

(2)

(wherein, each $R^1$ represents, independently, a monovalent organic group, and m is an integer from 0 to 100, and preferably from 0 to 60)]

Examples of the bivalent organic group A in the general formula (1) shown above include the groups shown below, although the bivalent organic group A is not restricted to these groups.

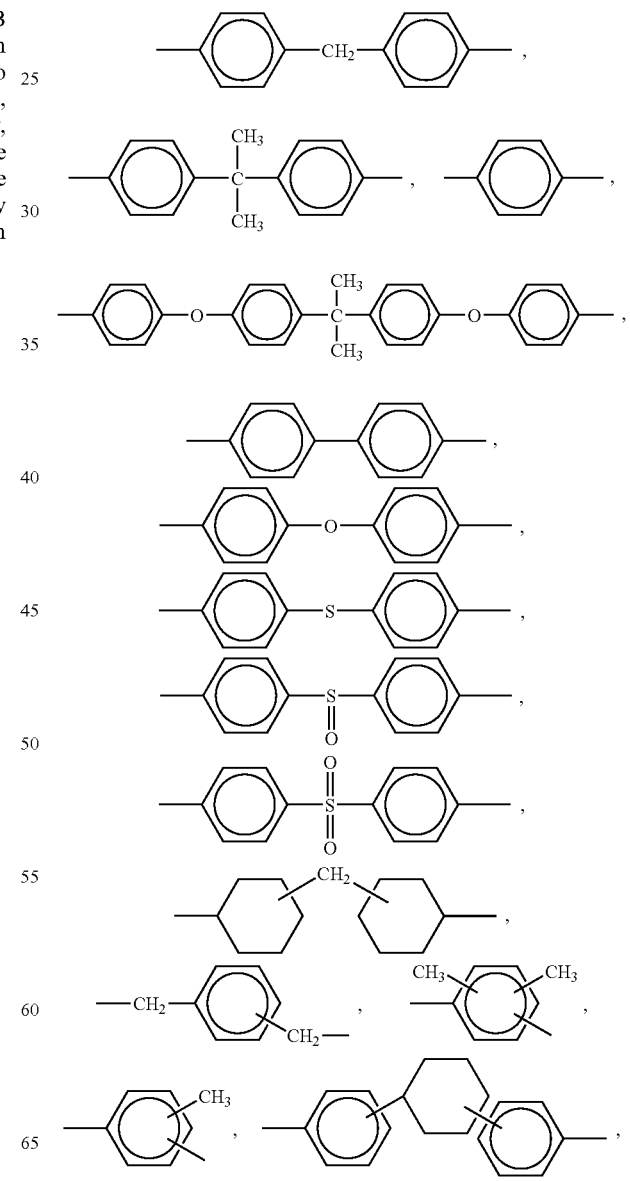

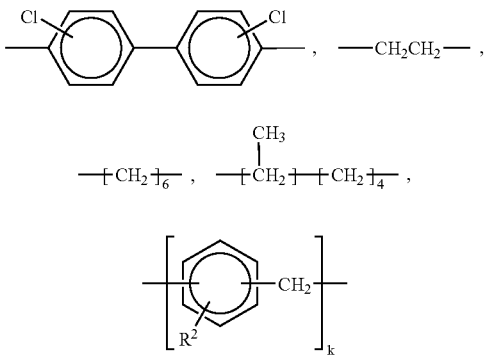

(wherein, $R^2$ represents an unsubstituted or substituted monovalent hydrocarbon group of 1 to 10 carbon atoms, and preferably of 1 to 6 carbon atoms, and k is an integer from 1 to 20, and preferably from 1 to 10)

Examples of the aforementioned $R^2$ include alkyl groups such as methyl groups, ethyl groups, propyl groups, butyl groups, pentyl groups, and hexyl groups; cycloalkyl groups such as cyclopentyl groups and cyclohexyl groups; aryl groups such as phenyl groups, tolyl groups, and xylyl groups; aralkyl groups such as benzyl groups and phenethyl groups; and halogenated alkyl groups such as 3,3,3-trifluoropropyl groups and 3-chloropropyl groups.

Furthermore, examples of the monovalent organic group $R^1$ in the general formula (2) shown above include unsubstituted or substituted monovalent hydrocarbon groups of 1 to 12 carbon atoms, and preferably of 1 to 8 carbon atoms, including alkyl groups such as methyl groups, ethyl groups, propyl groups, butyl groups, pentyl groups, and hexyl groups; cycloalkyl groups such as cyclopentyl groups and cyclohexyl groups; aryl groups such as phenyl groups, tolyl groups, and xylyl groups; aralkyl groups such as benzyl groups and phenethyl groups; halogenated alkyl groups such as 3,3,3-trifluoropropyl groups and 3-chloropropyl groups; trialkoxysilylated alkyl groups such as 2-(trimethoxysilyl) ethyl groups; as well as alkoxy groups such as methoxy groups, ethoxy groups, and propoxy groups; aryloxy groups such as phenoxy groups; and cyano groups.

Examples of imide silicone resins of the present invention include resins with the repeating units shown in the formulas below, although the imide silicone resins are not restricted to them. Furthermore, copolymers containing 2 or more of the following repeating units are also possible.

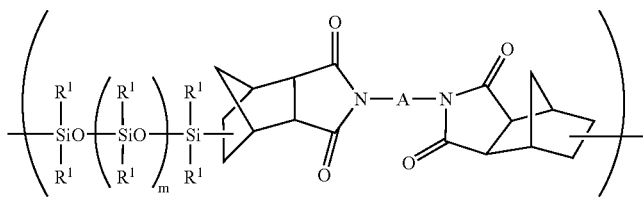

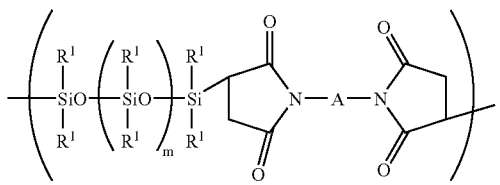

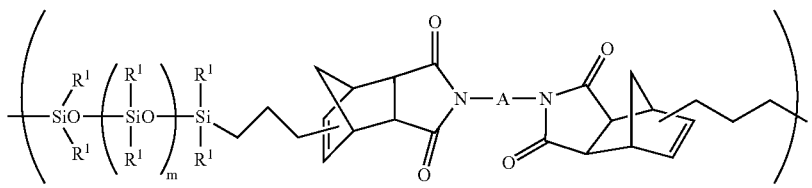

(wherein, A, $R^1$ and m are as defined above in relation to the general formula (1) and the general formula (2))

[Production of an Imide Silicone Resin]

<Organopolysiloxane>

In order to synthesize an imide silicone resin of the present invention, an organopolysiloxane represented by a general formula (4) shown below, with two hydrogen atoms bonded to the terminal silicon atoms, is used.

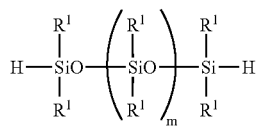

(4)

(wherein, $R^1$ is as defined above, and m is an integer from 0 to 100, and preferably from 0 it 60)

Examples of the organopolysiloxane described above include dimethylpolysiloxane with both molecular chain terminals blocked with dimethylhydrogensiloxy groups, copolymers of dimethylsiloxane and methylphenylsiloxane with both molecular chain terminals blocked with dimethylhydrogensiloxy groups, and methylphenylpolysiloxane with both molecular chain terminals blocked with dimethylhydrogensiloxy groups.

Preferred specific examples are shown below, although the organopolysiloxane is not restricted to these structures (Me represents a methyl group).

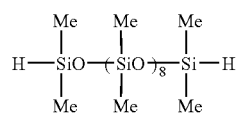

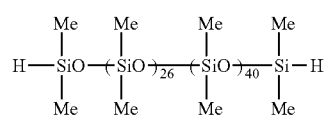

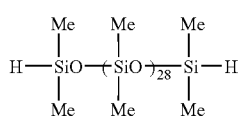

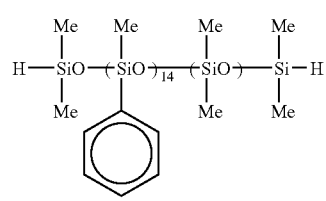

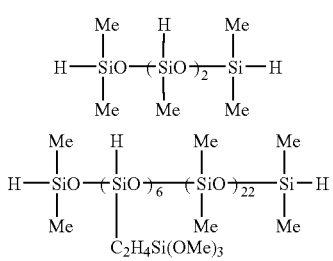

These organopolysiloxanes can be used either singularly, or in combinations of two or more compounds.

<Imide Compound>

In order to synthesize an imide silicone resin of the present invention, an imide compound represented by a general formula (5) shown below, with two addition reaction reactive carbon-carbon double bonds, is used.

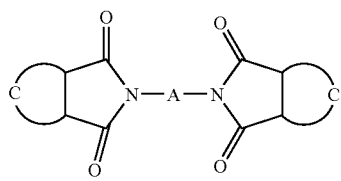

(5)

[wherein, A is as defined above, and each C represents, independently, a bivalent group selected from the groups shown below:

 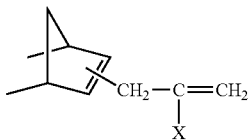

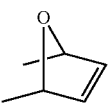 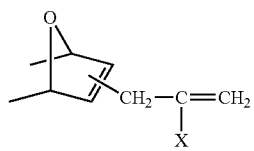

 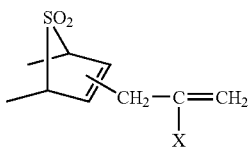

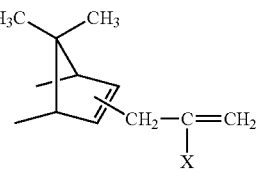

-continued
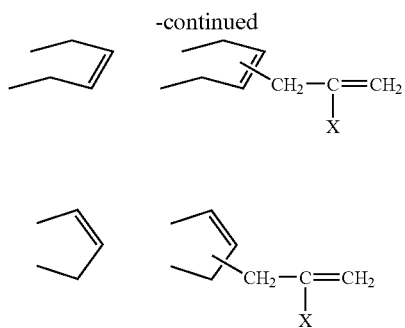
(wherein, X represents a hydrogen atom or a methyl group)].
Furthermore, imide compounds represented by the general formula shown below can also be used.
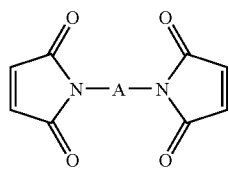
(wherein, A is as defined above)
Specific examples of the imide compound used in the present invention are shown below, although the imide compound is not restricted to these compounds.
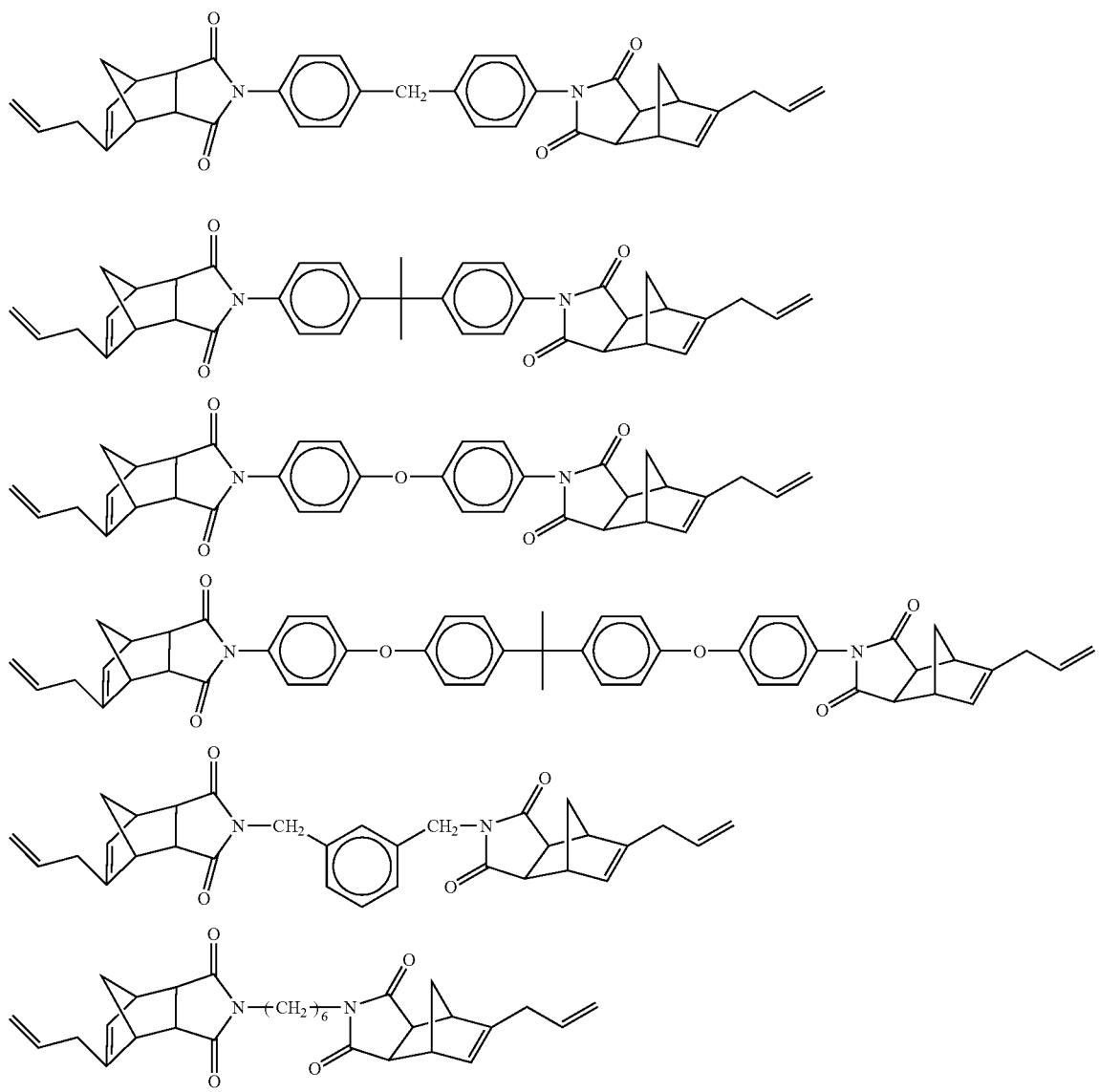

These imide compounds can be used either singularly, or in combinations of two or more compounds.

In terms of the reactivity of the imide compound, in the case of an imide compound containing both an olefin based carbon-carbon double bond within a ring (in other words, a bivalent group represented by —CH=CH—), and an olefin based carbon-carbon double bond such as an allyl group (a monovalent group such as —CH=CH$_2$) within a single molecule, the former (the bivalent group) contributes essentially nothing to the hydrosilylation reaction (addition reaction with a ≡SiH group) and is inactive, whereas the latter (the allyl group or the like) displays reactivity within the above reaction.

<Addition Reaction>

A production process for an imide silicone resin according to the present invention involves an addition by hydrosilylation of an aforementioned imide compound containing an olefin based carbon-carbon double bond and an aforementioned organopolysiloxane (for example, an addition reaction of ≡SiH and either CH$_2$=CH— or —CH=CH—), and the catalyst used during this reaction can be a conventionally known catalyst, with preferred catalysts including platinum based catalysts such as chloroplatinic acid, alcohol solutions of chloroplatinic acid, olefin complexes of platinum, alkenylsiloxane complexes of platinum, and carbonyl complexes of platinum; rhodium based catalysts such as tris(triphenylphosphine)rhodium; and iridium based catalysts such as bis(cyclooctadienyl)dichloroiridium. There are no particular restrictions on the quantity of the addition reaction catalyst used, which need only be an effective catalytic quantity, although a typical quantity is within a range from 0.001 to 20 parts by weight, and preferably from 0.01 to 5 parts by weight, per 100 parts by weight of the combined weight of the imide compound and the organopolysiloxane described above.

Furthermore in the above addition reaction, a solvent may not be needed depending on the nature of the reaction raw materials described above, although use of a solvent where required is also acceptable. In those cases where a solvent is used, examples of suitable solvents include aromatic hydrocarbons such as benzene, toluene and xylene; ether based solvents such as tetrahydrofuran and ethylene glycol butyl ether acetate; aliphatic hydrocarbons such as hexane and methylcyclohexane; and polar solvents such as N-methyl-2-pyrrolidone, γ-butyrolactone and cyclohexanone.

There are no particular restrictions on the reaction temperature, although the temperature is preferably within a range from 60° C. to 120° C., and the reaction time is typically from approximately 30 minutes to approximately 12 hours.

In addition, in the above addition reaction, if the ≡SiH group equivalence of the organopolysiloxane containing two or more hydrogen atoms bonded to silicon atoms (namely, ≡SiH groups) within one molecule is deemed α, and the equivalence of olefin based carbon-carbon double bonds that display reactivity in the hydrosilylation reaction within the imide compound containing two or more olefin based carbon-carbon double bonds within one molecule is deemed β, then the mixing ratio of the two components is typically $0.67 \leq \alpha/\beta \leq 1.5$, and preferably $0.95 \leq \alpha/\beta 1.05$. If the value of the above ratio is outside this range, whether it be smaller or larger, then a large molecular weight cannot be expected, and a satisfactory cured resin coating cannot be formed from the produced imide silicone resin.

[Imide Silicone Cured Resin Coating]

By dissolving an imide silicone resin of the present invention in a solvent such as those listed above as suitable for use within the addition reaction, including toluene, tetrahydrofuran or ethylene glycol butyl ether acetate, applying the solution to a substrate formed from a suitable base material, including metals such as iron, copper, nickel or aluminum, or glass, volatilizing and removing the solvent to generate a film, and then heating at a temperature of 40° C. to 400° C., and preferably of 80° C. to 250° C., for a period of 0.01 to 30 hours, and preferably of 0.1 to 20 hours, a cured resin coating with a smooth surface, which displays excellent solvent resistance to alcohols, ketones and toluenes and the like, can be formed. The cured resin coating can be formed at any thickness within a range from 1 μm to approximately 1 cm, depending on the formation method used. Furthermore, the produced cured resin coating displays excellent adhesion and bonding to the base material.

During the curing of an imide silicone resin of the present invention, a curing catalyst can also be added to accelerate the cross linking reaction. Examples of suitable curing catalysts include organic peroxides, onium salts and cation catalysts. Examples of organic peroxides include benzoyl peroxide, 2,4-diisopropyl benzene hydroperoxide, dicumyl peroxide, diisobutyl peroxide, bis-(4-t-butylcyclohexyl) peroxide, t-butylperoxy isobutyrate, 2,2'-azobis(2-methylbutyronitrile), dimethyl-2,2'-azobis(2-methylpropionate), and 2,2'-azobis[N-(2-propenyl)-2-methylpropioamide], examples of onium salts include pyridinium p-toluenesulfonate, pyridinium m-nitrobenzenesulfonate, and benzyltriethylammonium chloride, and examples of cation catalysts include p-toluenesulfonic acid, methyl p-toluenesulfonate, and p-xylenesulfonic acid. If a curing catalyst is used, then there are no particular restrictions on the quantity used, which need only be an effective catalytic quantity, although a typical quantity is within a range from 0.1 to 4 parts by weight per 100 parts by weight of the combined weight of the organopolysiloxane and the imide compound described above.

Furthermore, the mechanism of the cross linking and curing reaction described above is thought to be based on cleavage of the olefin based carbon-carbon double bonds within the ring, which did not participate in the hydrosilylation reaction, and/or any terminal olefin based carbon-carbon double bonds remaining after the hydrosilylation reaction.

[Other Components]

In addition, if required, inorganic fillers may also be added to an imide silicone resin of the present invention to form a resin composition. Examples of suitable inorganic fillers include fused silica, crystalline silica, alumina, carbon black, mica, clay, kaolin, glass beads, aluminum nitride, zinc oxide, calcium carbonate, and titanium oxide. These inorganic fillers can be used either singularly, or in combinations of two or more fillers. Furthermore, there are no particular restrictions on the quantity of the filler, although quantities from approximately 1 to approximately 500 parts by weight per 100 parts by weight of the imide silicone resin are preferred.

Furthermore, if required, conductive particles may also be added to an imide silicone resin of the present invention to impart conductivity to the resin composition. Examples of suitable conductive particles include metal particles of gold, silver, copper or nickel or the like, or particles in which a plastic or the like is covered with a metal. These conductive particles can be used either singularly, or in combinations of two or more particles. Furthermore, there are no particular restrictions on the quantity of the particles, although quantities from approximately 100 to approximately 1000 parts by weight per 100 parts by weight of the imide silicone resin are preferred.

In addition, in order to improve the adhesion and bonding between the cured resin coating obtained by curing an imide silicone resin of the present invention and a base material, carbon functional silanes may also be added as required. Examples of carbon functional silanes include γ-glycidoxypropyltrimethoxysilane, γ-aminopropyltrimethoxysilane, 2-(γ-aminopropyl)ethyltrimethoxysilane, and vinyltrimethoxysilane. These compounds can be used either singularly, or in combinations of two or more compounds. Furthermore, typically quantities of the carbon functional silane are from approximately 0.1 to approximately 10 parts by weight per 100 parts by weight of the imide silicone resin.

EXAMPLES

Example 1

(Synthesis of an Imide Silicone Resin)

In a 1 L flask equipped with a stirrer, a thermometer and a nitrogen exchange device were placed 100 parts by weight (0.175 mols) of an imide compound with olefin based carbon-carbon double bonds, as represented by a formula shown below:

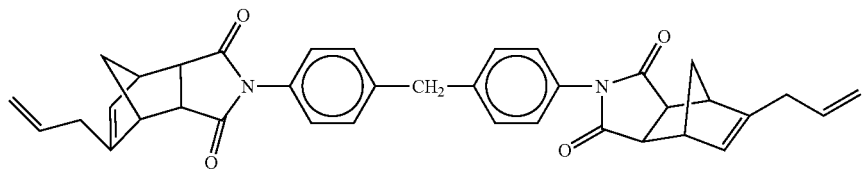

128 parts by weight (0.176 mols) of an organopolysiloxane represented by an average structural formula shown below:

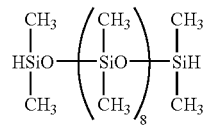

and 200 parts by weight of toluene, and subsequently 0.2 parts by weight of a 2% by weight ethanol solution of chloroplatinic acid was added, and the mixture was stirred for 5 hours at 90° C. The solvent was removed from the thus obtained product, which yielded 218 parts by weight of the target imide silicone resin. The external appearance of this imide silicone was of a light yellow colored, transparent solid. The dumber average molecular weight, as determined by gel permeation chromatography (GPC), was 12,000.

As a result of GPC analysis, IR analysis, and $^1$H-NMR analysis, it was evident that the produced imide silicone resin had a structure represented by the average structural formula shown below.

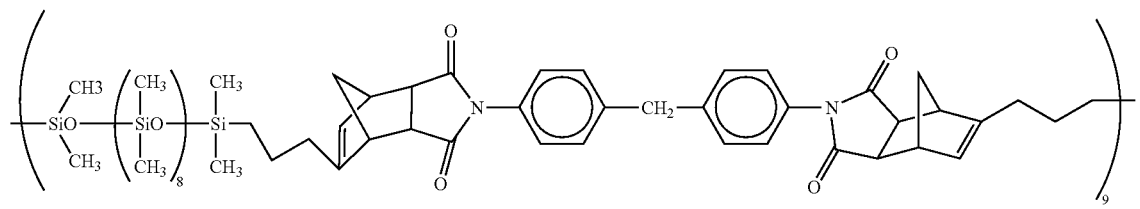

The results of the IR analysis and the $^1$H-NMR analysis are shown below.

IR Analysis
  alkane C—H stretch: 2962 cm$^{-1}$
  imide C=O stretch: 1778 cm$^{-1}$ and 1714 cm$^{-1}$
  imide C—N stretch: 1379 cm$^{-1}$ weight, as determined by gel permeation chromatography (GPC), was 19,000.

As a result of GPC analysis, IR analysis, and $^1$H-NMR analysis, it was evident that the produced imide silicone resin had a structure represented by the average structural formula shown below.

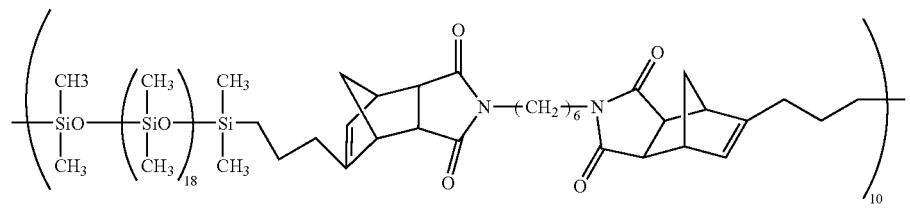

Si—C stretch: 1260 cm$^{-1}$
Si—O—Si stretch: 1099 cm$^{-1}$ $^1$H-NMR Analysis (Units: ppm)
  Si—CH$_3$: 0 to 0.3
  Si—CH$_2$—: 0.4 to 0.6
  imide double bond: 5.4 to 5.6
  phenyl group of diphenylmethane: 5.7 to 6.4

Furthermore, peaks in the vicinity of 4.5 ppm, indicating the presence of SiH groups, were not detected.

Example 2

(Synthesis of an Imide Silicone Resin)

In a 5 L flask equipped with a stirrer, a thermometer and a nitrogen exchange device were placed 488 parts by weight (1.0 mol) of an imide compound with olefin based carbon-carbon double bonds, as represented by a formula shown below:

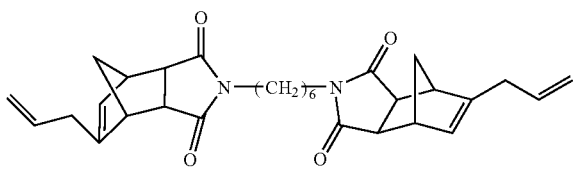

1466 parts by weight (1.6 mols) of an organopolysiloxane represented by an average structural formula shown below:

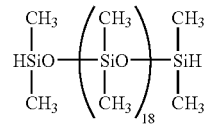

and 2000 parts by weight of toluene, and subsequently 0.8 parts by weight of a 2% by weight ethanol solution of chloroplatinic acid was added, and the mixture was stirred for 7 hours at 90° C. The solvent was removed from the thus obtained product, which yielded 1860 parts by weight of the target imide silicone resin. The external appearance of this imide silicone was of a light yellow colored, transparent solid with a tacky feel. The number average molecular The results of the IR analysis and the $^1$H-NMR analysis are shown below.

IR Analysis
  alkane C—H stretch: 2963 cm$^{-1}$
  imide C=O stretch: 1771 cm$^{-1}$ and 1704 cm$^{-1}$
  imide C—N stretch: 1379 cm$^{-1}$
  Si—C stretch: 1260 cm$^{-1}$
  Si—O—Si stretch: 1099 cm$^{-1}$ $^1$H-NMR Analysis (Units: ppm)
  Si—CH$_3$: 0 to 0.3
  Si—CH$_2$—: 0.4 to 0.6
  hexamethylene: 1 to 2
  imide double bond: 5.6 to 5.9

Furthermore, peaks in the vicinity of 4.5 ppm, indicating the presence of SiH groups, were not detected.

Example 3

(Synthesis of an Imide Silicone Resin)

In a 2 L flask equipped with a stirrer, a thermometer and a nitrogen exchange device were placed 200 parts by weight (0.41 mols) of an imide compound with olefin based carbon-carbon double bonds, as represented by a formula shown below:

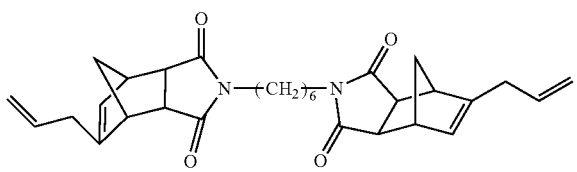

298 parts by weight (0.41 mols) of an organopolysiloxane represented by an average structural formula shown below:

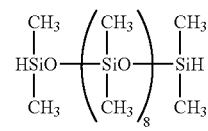

and 350 parts by weight of toluene, and subsequently 0.5 parts by weight of a 2% by weight ethanol solution of chloroplatinic acid was added, and the mixture was stirred for 5 hours at 90° C. The solvent was removed from the thus obtained product, which yielded 478 parts by weight of the target imide silicone resin. The external appearance of this imide silicone was of a light yellow colored, transparent viscous body. The number average molecular weight, as determined by gel permeation chromatography (GPC), was 16,000.

As a result of GPC analysis, IR analysis, and $^1$H-NMR analysis, it was evident that the produced imide silicone resin had a structure represented by the average structural formula shown below.

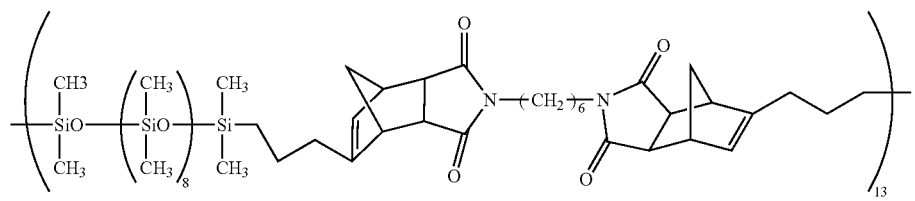

The results of the IR analysis are shown below.

IR Analysis
  alkane C—H stretch: 2963 cm$^{-1}$
  imide C=O stretch: 1778 cm$^{-1}$ and 1714 cm$^{-1}$
  imide C—N stretch: 1379 cm$^{-1}$
  Si—C stretch: 1260 cm$^{-1}$
  Si—O—Si stretch: 1098 cm$^{-1}$ Example 4

(Preparation of an Imide Silicone Cured Resin Coating)

Each of the imide silicone resins obtained in the examples 1 to 3 described above was dissolved in methyl ethyl ketone to form a resin solution with a concentration of 30% by weight.

Each of these resin solutions was applied to a glass substrate, and heated for 30 minutes at 60° C. and then for 2 hours at 230° C., to prepare an imide silicone cured resin coating (thickness: 90 μm).

Each of the glass substrate bonded cured resin coatings obtained above was immersed for 5 minutes in methyl ethyl ketone at 25° C., and the surface of the coating was inspected for changes. The results are shown in Table 1.

The table entry "surface smooth" indicates that when the cured resin coating surface was subjected to swelling with methyl ethyl ketone, no deformation or irregularities developed on the surface.

Furthermore, each of the resin solutions was also applied to a copper substrate and a glass substrate, and heated for 30 minutes at 60° C. and then for 2 hours at 230° C., to form an imide silicone cured resin coating (thickness: 15 μm) on each of the substrates. Subsequently, the coatings were left to stand for 72 hours in saturated water vapor at 2.1 atmospheres, and the cured coating on each substrate was subjected to a cross-hatch peeling test (JIS K 5400) to evaluate the adhesion following exposure to conditions of high humidity. The results are shown in Table 1.

The numbers shown in Table 1 (numerator/denominator) represent the number of sections that did not peel off (numerator) from the total number of sections 100 (denominator). In other words, a result of 100/100 indicates absolutely no peeling, whereas a result of 0/100 indicates that all the sections peeled off.

Next, each of the resin solutions described above was applied to a copper substrate, and an imide silicone cured resin coating (thickness: 15 μm) was formed on the copper substrate under the same conditions as described above. Using these coated substrates as test pieces, the flexing properties were investigated using a 2 mmφ mandrel. The results are shown in Table 1.

The symbol O represents good flexing properties, indicating that separation of the coating from the substrate, or cracking of the cured coating did not occur.

TABLE 1

| Resin | Solvent Resistance | Adhesion (cross-hatch peeling test) | | Flexing properties |
|---|---|---|---|---|
| | | Copper | Glass | |
| Example 1 | surface smooth | 100/100 | 100/100 | O |
| Example 2 | surface smooth | 100/100 | 100/100 | O |
| Example 3 | surface smooth | 100/100 | 100/100 | O |

What is claimed is:

1. An imide silicone resin with a structure represented by a general formula (1) shown below:

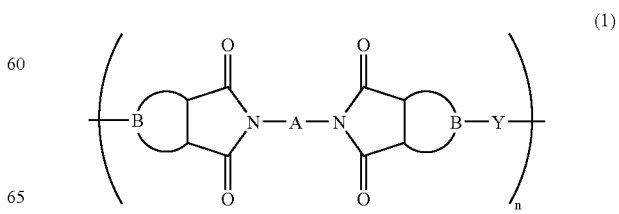

wherein, each A is a bivalent organic group, each B represents, independently, a trivalent group selected from groups having the formulas shown below, in which two single bonds protruding in a substantially identical direction are bonded to an imide ring to form a ring structure and the third single bond is bonded to Y, Y is a bivalent group represented by formula (2) shown below, and n is an integer from 2 to 100:

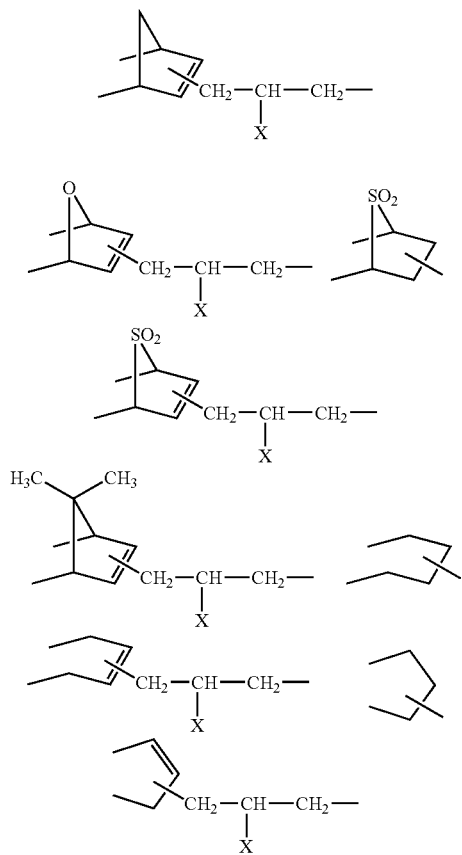

wherein in each formula, X represents a hydrogen atom or a methyl group,

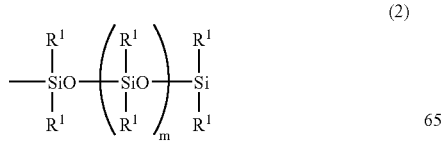

wherein, $R^1$ represents, independently, a monovalent organic group, and m is an integer from 0 to 100.

2. The imide silicone resin according to claim 1, with a structure represented by formula (3) shown below:

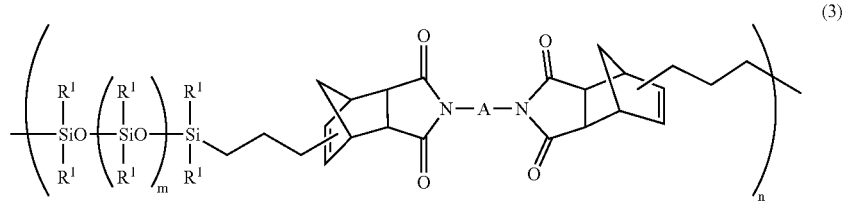

wherein $R^1$, A, m, and n are as defined above.

3. The imide silicone resin according to claim 1, wherein said n is an integer from 3 to 70.

4. The imide silicone resin according to claim 1, wherein said m is an integer from 0 to 60.

5. The imide silicone resin according to claim 1, wherein each A is represented by the formula:

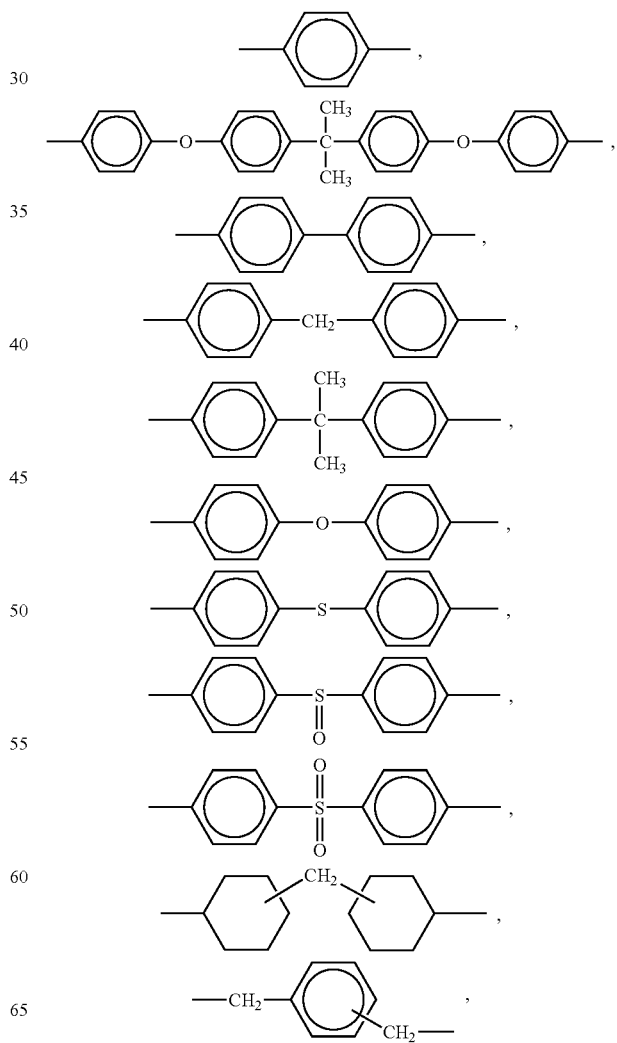

-continued

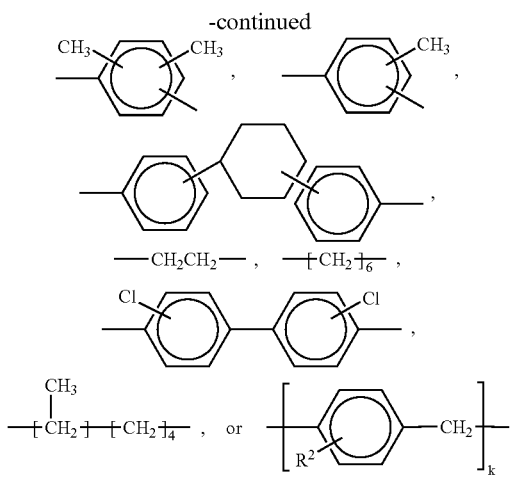

wherein, R² represents an unsubstituted or substituted monovalent hydrocarbon group of 1 to 10 carbon atoms, and k is an integer from 1–20.

6. The imide silicone resin according to claim 5, wherein said R² represents an unsubstituted or substituted monovalent hydrocarbon group of 1 to 6 carbon atoms.

7. The imide silicone resin according to claim 5, wherein said k is an integer from 1 to 10.

8. The imide silicone resin according to claim 1, wherein said R¹ represents an unsubstituted or substituted monovalent hydrocarbon group of 1 to 12 carbon atoms.

9. The imide silicone resin according to claim 1, wherein said R¹ represents an unsubstituted or substituted monovalent hydrocarbon group of 1 to 8 atoms.

10. A production process for the imide silicone resin according to claim 1, comprising:
subjecting an organopolysiloxane represented by a general formula (4) shown below and in imide compound represented by a general formula (5) shown below to an addition reaction:

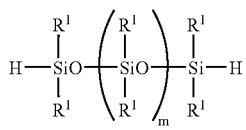 (4)

wherein, each R¹ represents, independently, a monovalent organic group, and m is an integer from 0 to 100,

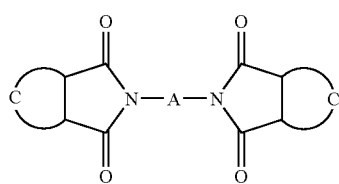 (5)

wherein, A is a bivalent organic group, and each C represents, independently, a bivalent group selected from groups shown below:

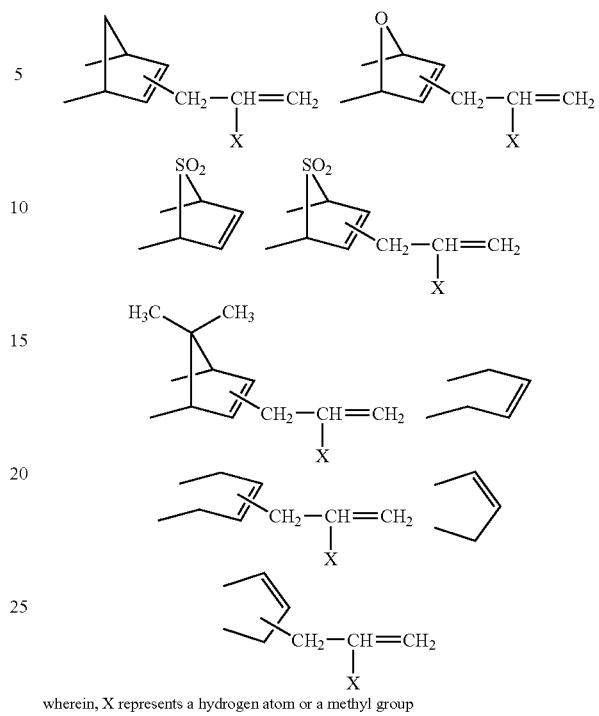

wherein, X represents a hydrogen atom or a methyl group

11. The production process according to claim 10, wherein in said imide compound represented by said general formula (5), said C is a bivalent group represented by a formula shown below:

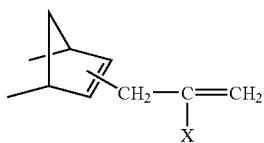

wherein, X is as defined above.

12. The production process according to claim 10, wherein said m is an integer from 0 to 60.

13. The production process according to claim 10, wherein said organopolysiloxane is a dimethylpolysiloxane with both molecular chain terminals blocked with dimethyihydrogensiloxy groups, a copolymer of dimethylsiloxane and methyiphenylsiloxane with both molecular chain terminals blocked with dimethyihydrogensiloxy groups, a methyiphenylpolysiloxane with both molecular chain terminals blocked with dimethylhydrogensiloxy groups, or a mixture of two or more thereof.

14. The production process according to claim 10, wherein said organopolysiloxane is:

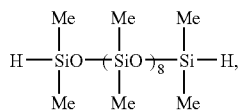

-continued
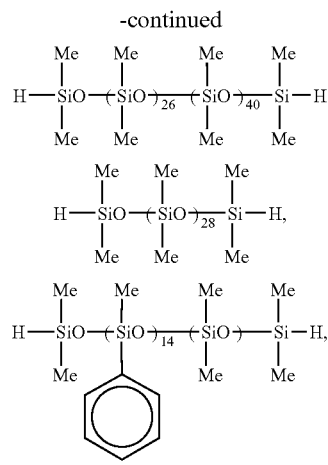
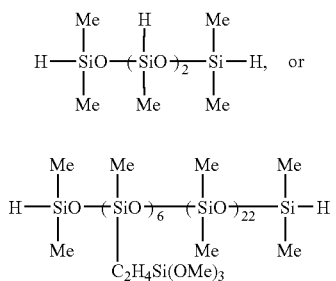
wherein the formulas Me represents a methyl group.
15. The production process according to claim 10, wherein said imide compound comprises at least one compound shown below:
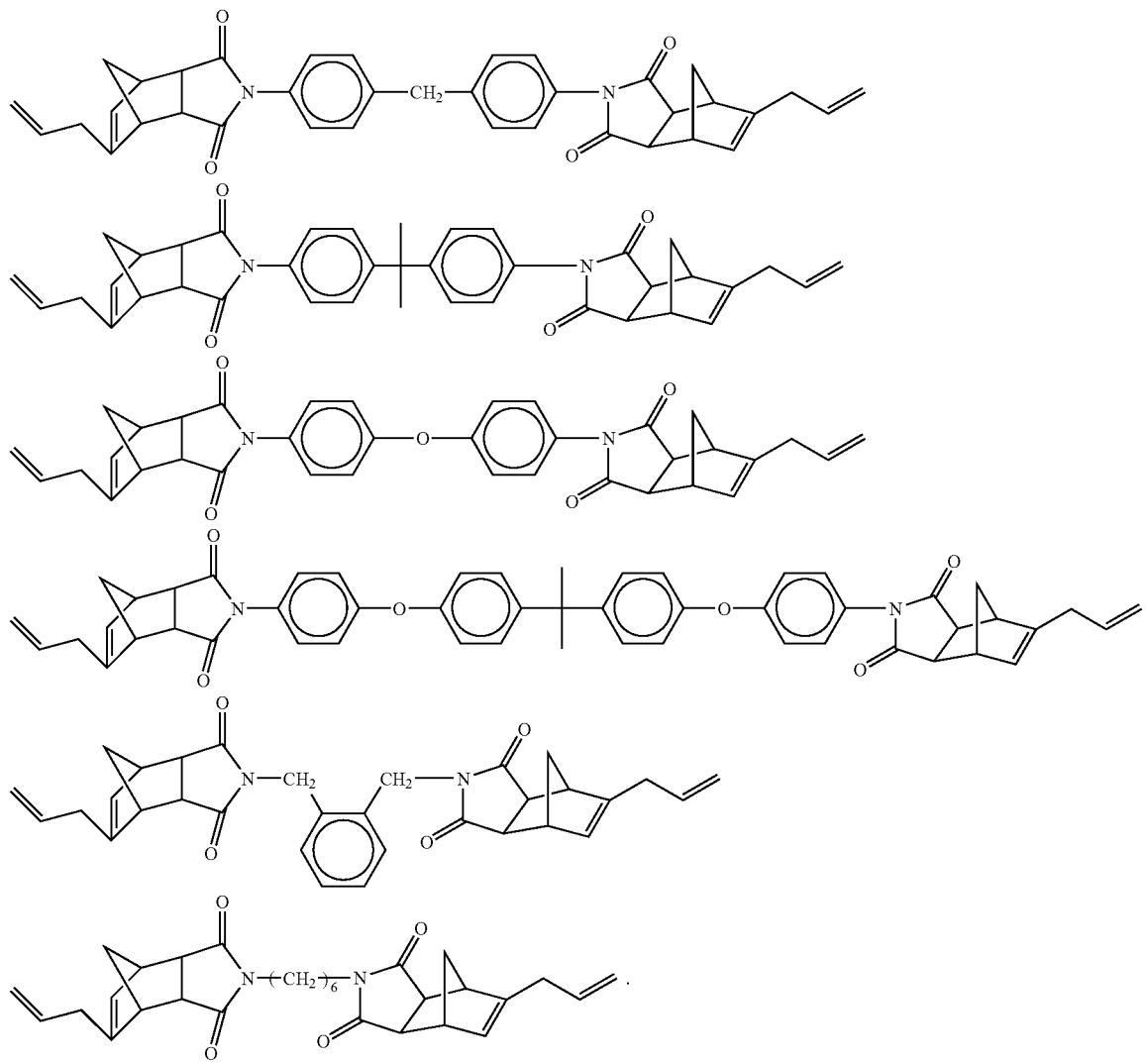
16. A cured resin coating formed by curing an imide silicone resin according to claim 1.
* * * * *